Nov. 19, 1957  H. S. SAYRE  2,813,758

PNEUMATIC CONVEYING

Filed Sept. 22, 1954  5 Sheets-Sheet 1

INVENTOR.
HOWARD S. SAYRE

Nov. 19, 1957  H. S. SAYRE  2,813,758
PNEUMATIC CONVEYING
Filed Sept. 22, 1954  5 Sheets-Sheet 2

INVENTOR.
HOWARD S. SAYRE

FIG. 4

INVENTOR.
HOWARD S. SAYRE

FIG. 6

United States Patent Office 2,813,758
Patented Nov. 19, 1957

2,813,758

PNEUMATIC CONVEYING

Howard S. Sayre, Bethlehem, Pa., assignor to Fuller Company, Catasauqua, Pa., a corporation of Delaware Application September 22, 1954, Serial No. 457,670

11 Claims. (Cl. 302—53)

This invention relates to apparatus for unloading hopper bottom vessels, and more particularly is concerned with a novel unloader for hopper bottom vehicles provided with aeration means utilized in the transportation of finely divided or pulverulent material having the characteristics of becoming fluent when admixed with air or other inert gas in appropriate proportions. The apparatus of the invention is especially designed for the transportation and discharge of bulk quantities of pulverulent material such as flour, other pulverulent food products, dry, finely divided chemicals, and other materials, and particularly those which do not flow freely from ordinary vessels.

This apparatus of the invention is intended for use in conjunction with pneumatic conveying systems of the type that are widely used for transporting pulverulent or crushed materials entrained in an air stream. Such pneumatic systems usually have a receiver, maintained under reduced pressure by suitable means, connected to one end of a conveying conduit. The other end of the conduit is connected to an unloader adapted to receive the material to be conveyed. The conventional unloader includes a nozzle, with air admitted into the unloader adjacent the nozzle, entraining the material, and causing a flow of air and material through the conduit into the receiver as a result of the reduced pressure within the receiver.

Unloaders of the kind heretofore used in the conveying systems described have been found to have certain disadvantages when the systems are used for unloading vessels of the hopper bottom type, especially hopper bottom vehicles, in which the unloader nozzle lies below the well of the hopper. These disadvantages are particularly magnified when the vehicle must be designed to transport a wide variety of different materials, and discharge these materials into pneumatic conveying systems of varied designs, operating characteristics, and conveying capacities.

When certain materials within a vessel are transported or stored for a considerable time, they lose their free flowing characteristics, so that, as material adjacent the unloading nozzle is removed during the operation, a cavity is left around the nozzle, with the result that the entraining air traveling into the nozzle fails to loosen the material and transport it through the system. Similarly, when the vessel is nearly empty, it has not been possible to effect complete removal of the material, resulting in a substantial amount of material either being left behind, or removed by manual labor. A further disadvantage of this class of unloader is found in the inability of the compacted unaerated material to become readily and efficiently entrained in the air stream of the pneumatic conveyor, thereby substantially reducing the designed conveying capacity of the system.

Prior means have been utilized in storage vessels and bulk transportation vehicles to overcome the sluggish conveying characteristics of a compact inert material. These means include an air activated gravity conveyor formed as the bottom of the vessel hopper for the purpose of fluidizing the material in the vessel to render it fluent, whereby it will readily flow through the discharge outlet of the vessel into the pneumatic conveying system.

The air activated gravity conveyor type of bulk transportation vehicle must be designed to accommodate a wide range of materials of different conveying characteristics to be commercially feasible. Each class of material to be transported has different fluidizing characteristics, resulting in the disadvantage that the vehicle must be designed to transport and discharge the most difficult material to fluidize. The result of this design is that the most difficult material will flow from the vehicle at a normal rate, while the more easily fluidizable material will flow from the vehicle at a much greater rate than desired. It is readily seen that in the event an easily fluidizable material is discharged from the vehicle into a small capacity pneumatic conveyor, the conveying system will become overloaded and inoperative due to the material being fed into the system in excess of its designed conveying capacity. Various controls have been proposed to overcome the flooding of the material from the vehicle or vessel into the conveying system, but the heretofore proposed control means have presented further disadvantages.

It has heretofore been proposed to control the rate of flow from the vehicle by providing a conventional valving means wherein the valve presents a single restricted opening to the material, determined in size by the fluent characteristics of the material being unloaded. This type valving means must be of a design wherein the discharge opening can be adjusted to a very small opening for an easily fluidized material, or to a wide opening for a material more difficult to fluidize. The two types of valves that have heretofore been used to best advantage are the horizontal gate valve and the rotary gate valve. Both of these valves restrict the discharge opening to a single narrow rectangular slot for a readily fluidizable material, with increasing dimensions for materials more difficult to fluidize. One disadvantage of these valves is that the valve gate forms an unaerated surface in the bottom of the vessel when the valve is in any position except wide open. This unaerated surface of the valve gate permits the formation of pinnacles of material above this surface and thereby hinders and restricts the flow of material from the side of the vessel adjacent the unaerated gate surface of the valve. A further disadvantage of these valves is that the material is discharged from the vessel into the unloader in a solid stream of material of the same configuration as the valve discharge opening, thereby presenting a single rectangular unit of material to be entrained in the air stream of the pneumatic conveying system. In most instances, it has been necessary to admit secondary conveying air into the unloader to provide for efficient entrainment of this single bulk unit of material into the conveying air stream, since there is not sufficient time to permit the air contained in the single bulk unit of material to properly expand and uniformly entrain the material in the conveying air stream. The negative fluidization of the material, whereby the air contained in the discharged material may expand to properly entrain the material in the conveying air stream, is possible if the depth of the unloader receptacle is great enough to provide sufficient time to permit the material to fall in a substantially vertical direction during its entrainment in the air stream. In most instances, the depth of the unloader receptacle is relatively shallow to comply with the various railroad regulations applicable to minimum rail clearance of a railroad vehicle, or road clearance for an automotive transportation vehicle. To provide the desired unloader receptacle depth to permit negative fluidization would result in either a reduction in the carrying capacity of the vehicle, or an increase in the height of the center of gravity of the vehicle with its known disadvantages.

The present invention is, accordingly, directed to a novel apparatus used for storing or transporting material to be ultimately entrained in the air stream of a pneumatic conveying system. The invention overcomes the objections to prior apparatus of this class in that it permits the container to be completely emptied of material at a controlled rate of discharge; and entrains the material in the air stream of a pneumatic conveying system in a manner which produces the maximum conveying efficiency without the necessity of admitting secondary conveying air to the system.

The preferred construction of the apparatus is adapted for use in a railroad hopper bottom car, and is provided with means to permit the railroad car to be unloaded from either side. The preferred construction of a railroad car incorporating this invention includes two hopper bottom receptacles, forming the lower portion of a main vessel, located adjacent each other on parallel center lines along the longitudinal center line of the main vessel. Each of the hopper bottom receptacles is provided with an air activated gravity conveyor formed as the bottom portion of each hopper bottom receptacle. Each hopper bottom receptacle is provided with a discharge opening, with the discharge openings of the receptacles positioned along a common center line athwart the longitudinal center line of the vessel. Each receptacle discharge opening communicates with a single unloading nozzle positioned beneath the main vessel, thereby providing an arrangement that permits the hopper bottom receptacles to function as a single unit wherein either receptacle may be unloaded separately, or both receptacles may be unloaded at the same time. A valving arrangement is provided at the discharge opening of each of the hopper bottom receptacles to provide for an accurate regulated flow of material from the hopper bottom receptacle into the unloading nozzle, and in addition to the foregoing, also provides a means for efficiently entraining the material in the air stream of the pneumatic conveying system.

The apparatus of the present invention comprises, generally, a bin having substantially vertical walls defining a main body portion, and a bottom formed of two hopper bottom receptacles, each having a gas permeable member as a bottom positioned below the receptacle and above a plenum chamber and a plurality of flow directing surfaces joining the body portion of the bin with the side walls of the gas permeable member. The flow directing surfaces are inclined at an angle greater than the angle of repose of any material to be stored in the bin, so that the material will flow downwardly along said surfaces by gravity from the body portion of the bin onto the upper surface of the gas permeable member where the material is fluidized by a gas delivered under pressure to the plenum chamber and which flows therefrom through the gas permeable member into the material. The gas permeable member is inclined with respect to the horizontal, toward its discharge end adjacent a discharge opening in the hopper bottom receptacle, so that the fluidized material on the upper, or material conveying surface, of the gas permeable member is caused to flow by gravitational force to the receptacle discharge opening. A material flow control means is provided adjacent each receptacle discharge opening and includes two parallel plates in sliding contact with each other. Each plate is formed with a multiplicity of openings extending over the entire area of the plate. One of the plates is secured to the body structure of the control means and the other of the plates is movable with relation to the secured plate. The movable plate controls the relationship between the respective multiplicity of openings in each plate. The movable plate may be adjusted to permit the openings of each plate to be in varying degrees of registry with each other, thereby providing a variable opening for the material from the receptacle into the nozzle receptacle. The movable plate may be positioned to completely close the receptacle discharge opening by moving the plurality of openings of the respective plates out of registry with each other.

The receptacle discharge opening control means permits the utilization of the entire valve surface under any discharging conditions, thereby greatly reducing the tendency of the material to bridge over, or form pinnacles, above the unaerated valve surface. The plurality of openings in the valve further permits the utilization of the principle of negative fluidization by dispensing the material into the unloading nozzle, and the conveying air stream in a multiplicity of individual streams of material, thereby eliminating the necessity of a relatively deep unloader receptacle necessary in the heretofore used apparatus to permit the air contained in the material to expand and be efficiently entrained in an air stream without the necessity of secondary conveying air.

The apparatus of the present invention will be more fully described in conjunction with the accompanying drawings.

Figure 1:
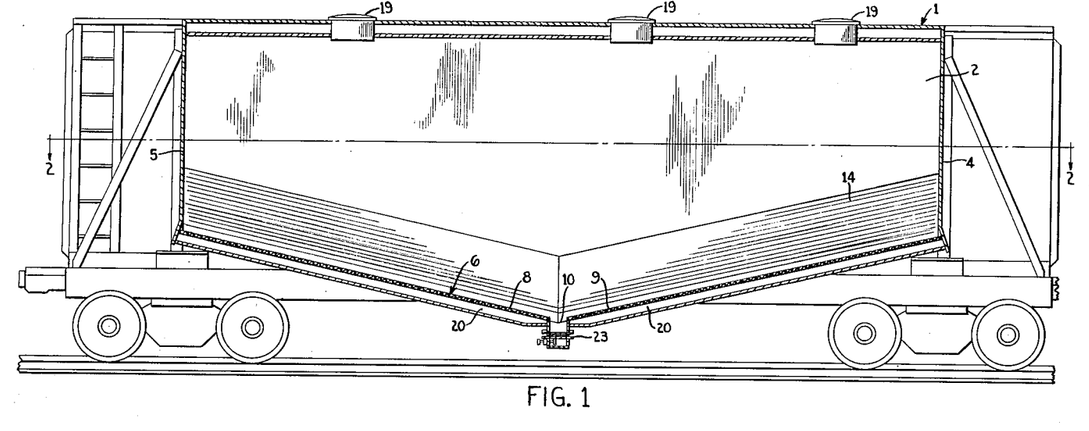
Fig. 1 is a vertical longitudinal sectional view of an improved railroad hopper bottom car embodying the features of the present invention taken on line 1—1 of Fig. 2.
Figure 2:
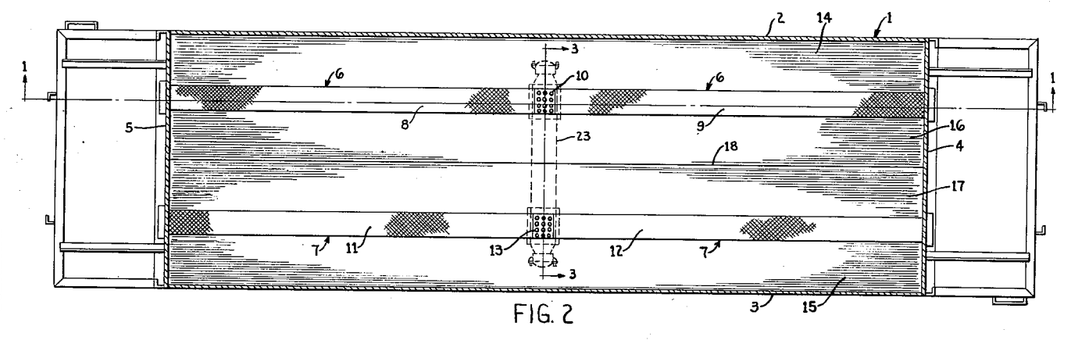
Fig. 2 is a horizontal sectional view taken along line 2—2 of Fig. 1.

In the preferred embodiment of the invention shown in Figs. 1 and 2, a storage bin, generally indicated at 1, has a body portion formed by a pair of opposite vertically extending side walls 2 and 3, and a pair of opposite vertically extending end walls 4 and 5. The bin has a closed bottom formed by a pair of elongated air activated gravity conveyors 6 and 7 extending lengthwise of the side walls 2 and 3. The width of the conveyor members 6 and 7 is substantially less than the distance between the side walls 2 and 3. The air activated gravity conveyor 6 is formed of two gas permeable sections 8 and 9, with both sections inclined with respect to the horizontal wherein the lowermost ends of the sections are adjacent a discharge opening 10. In a like manner, the air activated gravity conveyor 7 is divided into two gas permeable sections 11 and 12 with both sections inclined with respect to the horizontal wherein the lowermost ends are adjacent a second discharge opening 13. The lower portion of the bin 1 is provided with a plurality of sloping walls to provide for two hopper bottom receptacles. An outer inclined wall 14 slopes downwardly and inwardly from the side wall 2 to the outer side of the conveyor 6, and sloping side wall 15 extends downwardly and inwardly from the side wall 3 to the outer side of the conveyor 7. Sloping side walls 16 and 17 extend upwardly from the respective inner sides of the conveyors 6 and 7 and terminate along a common line 18 within the bin 1. It is, therefore, seen that the sloping walls 14 and 16 provide a hopper bottom receptacle 21 with a bottom formed of the conveyor 6, and the sloping side walls 15 and 17 form a second hopper bottom receptacle 22 with a bottom formed of the conveyor 7.

All of the sloping walls are inclined to the horizontal at an angle greater than the angle of repose of the pulverulent material to be transported in its unaerated state, so that as long as there is any of the material in the body 1, it will flow downwardly along said walls onto the gas-permeable members during the discharge operation.

Plenum chambers 20 extend along and beneath each of the gas-permeable members. Means, not disclosed, are provided for supplying gas under pressure to each of the plenum chambers to pass through the gas-permeable members and into the material lying upon their upper, or material-conveying, surfaces to aerate such material. Such gas supply means, as an air compressor, may be carried by the vehicle as a permanent part thereof, or such means, as plant air, may be located at the place of discharge and attached to the vehicle at such location.

The term "aeration" is employed herein to mean penetration of any gas, not necessarily air, into the material above the gas-permeable members at sufficient speed to expand the material and thereby reduce the particle-to-particle friction, but not at a speed sufficient to entrain particles of material in the gas stream.

When a pulverulent material is aerated by passage of a gas through a horizontal permeable member into the material, the material forms a definite angle with respect to the gas-permeable member. This angle is termed the "angle of repose" of the aerated material and is substantially less than the angle of repose of the same material before aeration. If the gas-permeable member is inclined with respect to the horizontal at an angle at least as great as the angle of repose of the aerated material, aeration of the material will cause the material to flow by gravity along the conveying surface of the permeable member to the lowermost end thereof. The angle of repose of an aerated pulverulent material is dependent upon the characteristics of the particular material, and varies with different materials. However, it has been found that if the gas-permeable member has an inclination with respect to the horizontal of from about four degrees to about fifteen degrees, practically any material which may be aerated will, when aerated, flow down such a member by gravity. Accordingly, the gas-permeable members preferably are so disposed that their upper or material-conveying surfaces form an angle with respect to the horizontal at least as great as the angle of repose of the material in its aerated state.

It is not necessary that air be used to aerate the material. The gas fed into the plenum chambers usually will be a gas which is inert with respect to the particular material in the storage space. The gas may be also heated or refrigerated, and, in some cases, it may be a gas which is chemically reactive with the material, depending upon the particular material and the characteristic which it is to have when discharged from the trailer. The gas-permeable members advantageously are constructed of multi-ply canvas, but may be of any gas-permeable material having a permeability preferably not substantially greater than 5.

The term "permeability" as herein employed is defined as the amount of air measured in cubic feet at 20° F. and 25% relative humidity which will pass through an area of one square foot of dry, porous medium in one minute when tested under an equivalent pressure differential of two inches of water.

A plurality of material inlet openings 19 are provided along the top of the bin 1 to permit the body 1 to be filled either pneumatically or by gravity. The openings 19 also provide an exit through which any excess pressure within the body 1, created during unloading, may be exhausted to atmosphere.

Figure 3:
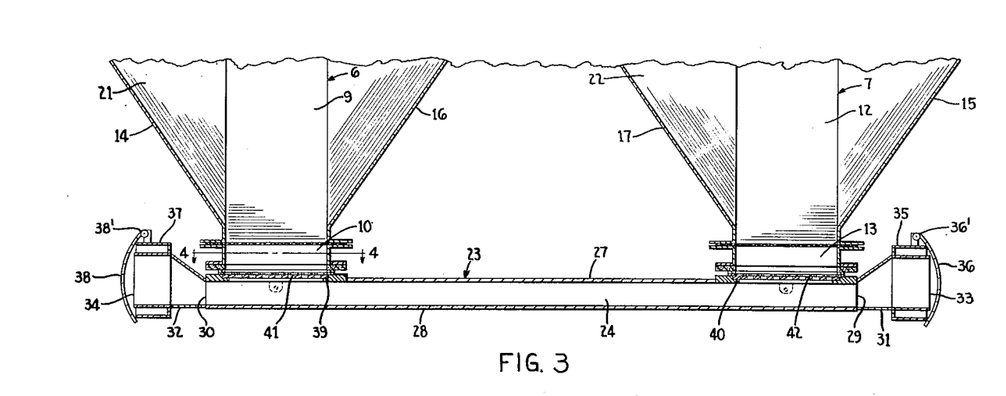
Fig. 3 is an enlarged cross sectional view of the hopper bottom receptacles and the unloader, along line 3—3 of Fig. 2.

An unloader 23 is positioned beneath the hopper bottom receptacles 21 and 22 and has an elongated rectangular entrainment chamber 24 defined by side walls 25 and 26, top wall 27 and bottom wall 28. The unloader is provided at each end with rectangular discharge openings 29 and 30, and transition sections 31 and 32 connected to the rectangular discharge openings and terminating in circular openings 33 and 34 for adaption to a conventional circular shaped conveying conduit of the inplant conveying system, not shown. A housing 35 having a movable cover 36 hinged at 36' closes the opening 33 for protection against the entrance of foreign material during transit; and, in a like manner, the opening 34 is provided with a housing 37 and a movable cover 38, hinged at 38', for the same purpose.

The unloader 23 is further provided with inlet openings 39 and 40. The inlet opening 39 is adjacent the receptacle 21 discharge opening 10 and provides communication between the receptacle 21 and the entrainment chamber 24 of the unloader. A control valve 41, positioned between the openings 10 and 39, regulates the rate of flow of material from the hopper bottom receptacle 21 into the unloader. The inlet opening 40 is adjacent the receptacle 22 discharge opening 13 and provides communication between the receptacle 22 and the entrainment chamber 24 of the unloader. A control valve 42, positioned between the openings 13 and 40, regulates the rate of flow of material from the hopper bottom receptacle 22 into the unloader. Flanges 43 of the unloader correspond with flanges 44 of the receptacles and are connected together in any conventional manner, such as by bolts 45, to securely attach the unloader to each of the receptacles. A gasket, such as rubber gasket 46, is provided to maintain an air tight seal at the flange connections between the unloader and the receptacles.

Figure 4:
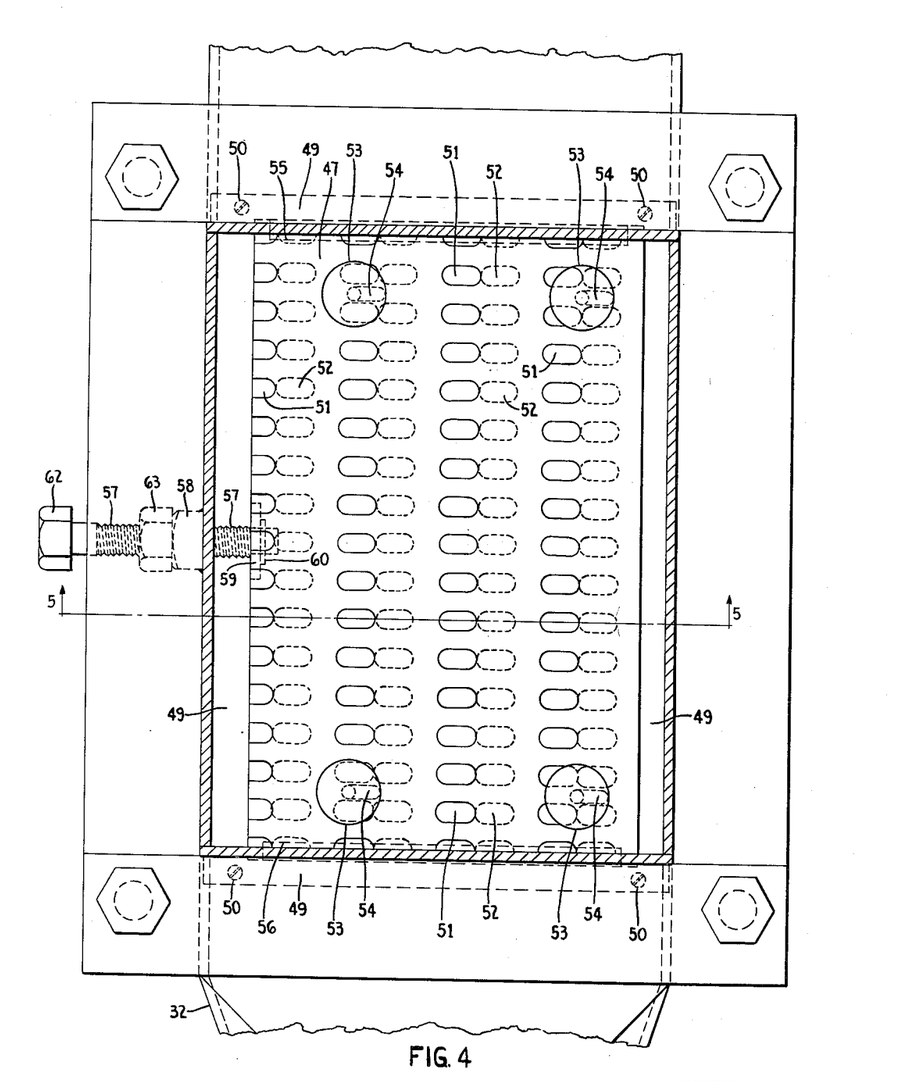
Fig. 4 is an enlarged top plan view of the control valve taken along line 4—4 of Fig. 3.
Figure 5:
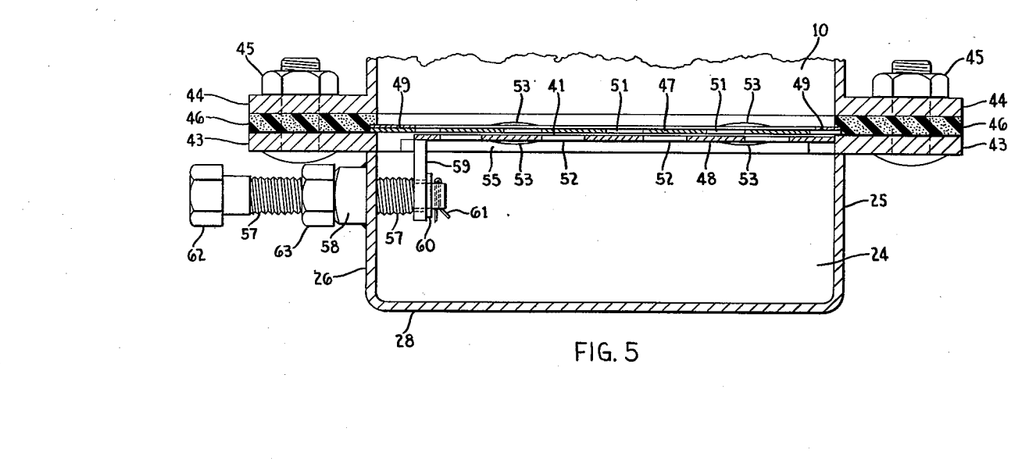
Fig. 5 is a sectional view of the control valve along line 5—5 of Fig. 4.

The control valve 41, disclosed in detail in Figs. 4 and 5, is the same as the control valve 42; and therefore, only one valve will be described in detail. The control valve 41 is formed by two perforated plates 47 and 48. The perforated plate 47, having a plurality of openings 51, is securely attached to the body structure of the unloader 23 by a flange plate 49 held in position by screws 50. The second perforated plate 48, having a plurality of openings 52, is positioned adjacent the perforated plate 47, and is held in sliding contact therewith by bolts 53 extending through the corresponding slots 54 of each perforated plate, and two guide rails 55 and 56 attached to the unloader body structure at each end of the plate 48.

A valve plate adjusting screw 57 extends through the side wall 26 and a threaded boss 58 attached to the side wall. The internal end of the adjusting screw 57 is attached to the perforated plate 48 through a vertical bracket 59 in any conventional manner that will permit rotation of the screw, for example, as by washer 60 and cotter pin 61. The external portion of the screw 57 has a bolt head 62 for receiving a conventional wrench to provide rotation of the screw 57 and the resulting horizontal movement of the perforated plate 48. The horizontal movement of the plate 48 will register its openings 52 with the openings 51 of the perforated plate 47 and provide for communication between the hopper bottom receptacle opening 10 and the inlet opening 39 of the unloader 23, thereby permitting material to flow from the bin 1 into the entrainment chamber 24 in a plurality of streams at a controlled rate. The greater the degree of registry between the openings 51 and 52, the greater is the flow of material through the valve 41, until the maximum rate of flow is obtained when the openings 51 and 52 coincide.

A lock nut 63 may be rotated on the screw 57 until it is securely in contact with the outer face of the boss 58 to lock the screw 57, and the plate 48, in any desired position.

In the operation of the apparatus, the vehicle is filled with material through the openings 19 to the desired height within the storage bin 1, and the vehicle is then transported to the desired location. During the filling of the vehicle and the transportation, the control valve 41 is placed in its closed position, as disclosed in Fig. 4.

Upon arrival of the vehicle at the point of destination, the vehicle is positioned adjacent the unloading conduit of a vacuum type inplant conveying system in general proximity to the unloader 23. The unloader 23 may be attached to the inplant conveying system through either of the discharge openings 33 or 34, depending upon which side of the vehicle is positioned adjacent the inplant conveying system. The inplant unloading conduit is attached to the unloader outlet 33, for example, in any conventional manner, such as a friction couple connection.

After the inplant conveying system is attached to the unloader 23, air is admitted to the plenum chambers 20 of the air activated gravity conveyors to provide for fluidization of the material within the storage bin 1 adjacent the upper surface of the gas permeable members 6 and 7. The fluidization of the material will cause the material to flow by gravitational force to the discharge openings 10 and 13 of the hopper bottom receptacles.

If preferred, both of the control valves 41 and 42 may be so adjusted to permit the discharge of material from both the openings 10 and 13; but, the normal operating procedure is to unload first one hopper bottom receptacle and then the other.

Both of the control valves 41 and 42 operate in an identical manner; and therefore, only the operation of one valve will be described in detail.

The lock nut 63 is loosened to permit rotation of the valve plate adjusting screw 57. The rotation of the valve plate adjusting screw 57 will impart a horizontal movement to the lower perforated plate 48, thereby bringing into registry the perforated plate openings 51 of the upper plate 47 and the openings 52 of the lower plate 48. The degree of registry between the plurality of openings 51 and 52 will be determined by the flowing characteristics of the material being unloaded and the conveying capacity of the inplant conveying system.

Fluidized material will flow through each of the plate openings, uniformly across the complete area of the discharge outlet 10, into the entrainment chamber 24 of the unloader in a plurality of finely divided streams that will be uniformly distributed throughout the cross sectional area of the entrainment chamber 24. This uniform distribution of the material within the entrainment chamber, and the effect of the reduced pressure created by the vacuum of the inplant conveying system, will permit the air contained in the material to expand and again render the material fluent by negative fluidization. The negative fluidizing air contained in the material provides the conveying medium, i. e., the air conveying stream, for the material in the inplant conveying system. It is readily seen that by providing a plurality of individual finely divided fluidized streams discharging into the entrainment chamber, the material will be more readily entrained in the air stream in the proper air-to-material ratio of the pneumatic conveying system. It is further readily seen that the plurality of finely divided fluidized material streams discharging into the entrainment chamber will permit a substantial reduction of the entrainment chamber depth due to the reduction in the time necessary in entraining this material in the conveying stream as compared to the time necessary to entrain the same amount of material presented to the conveying stream in a single bulk unit of material.

The multiplicity of openings covering the complete area of the valve structure will prevent the accumulation of material in the storage bin formed as a pinnacle of material above an unaerated surface.

If it is desired, a single perforated plate may be used as the material flow control means if the vehicle is designed for transporting a single class of material, or materials having the same fluidizing characteristics. In this arrangement, it is necessary to provide a conventional gate type control valve for the receptacle discharge outlet, and completely open the control valve when discharging material. This will eliminate the necessity for the adjustable features of the control valves 41 and 42, and still provide the desirable characteristics of a plurality of finely divided material streams discharging into the entrainment chamber.

Figure 6:
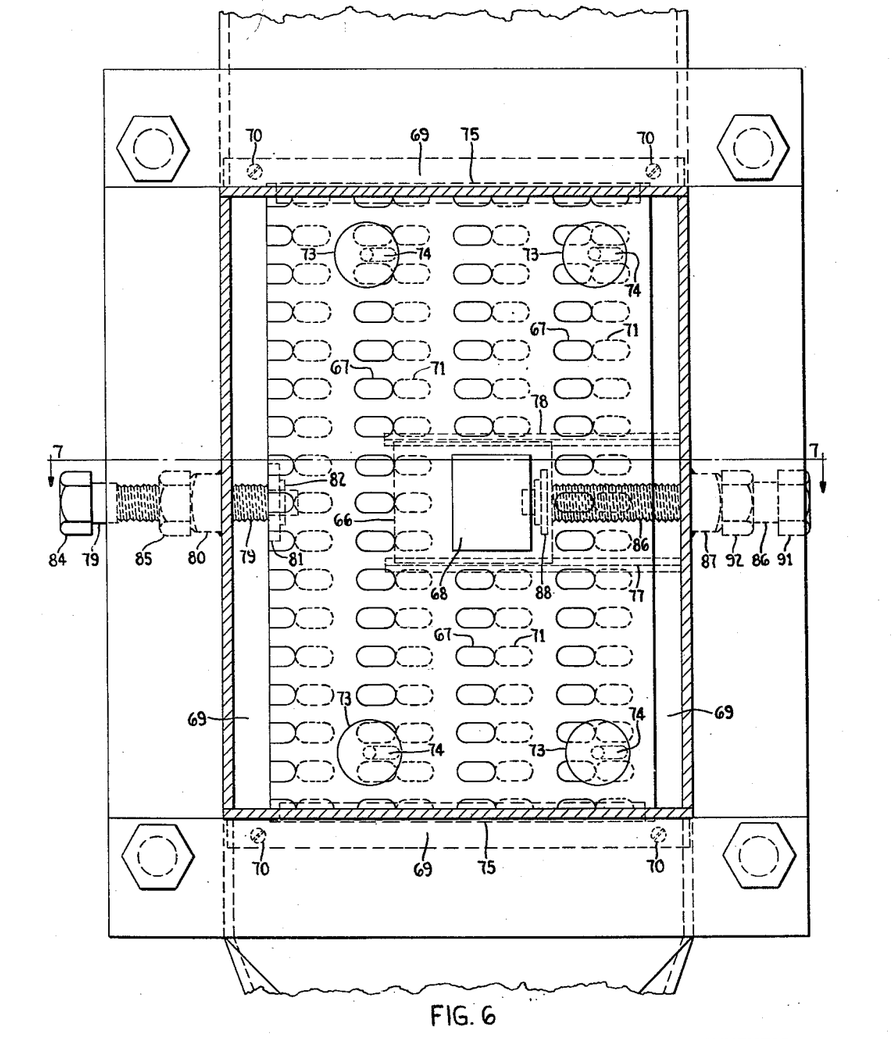
Fig. 6 is an enlarged top plan view of a modified form of the control valve taken along line 4—4 of Fig. 3.
Figure 7:
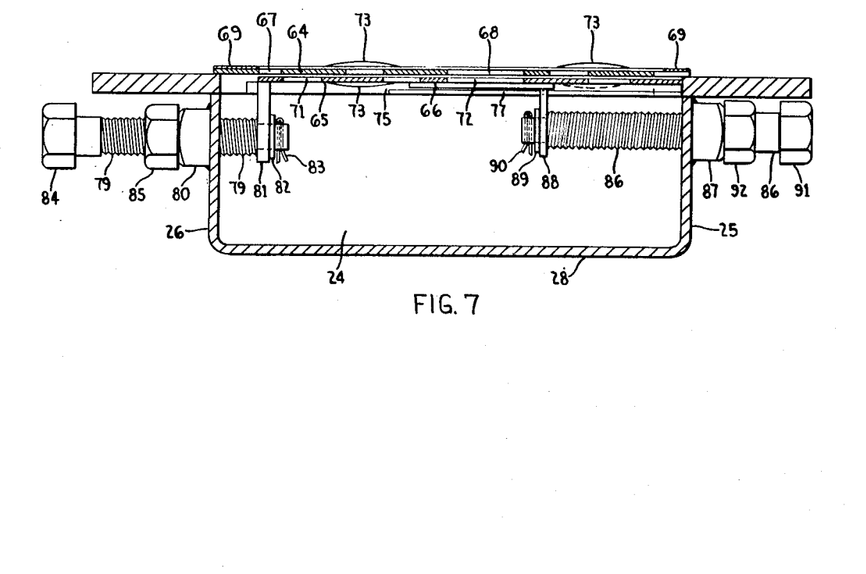
Fig. 7 is a sectional view of the modified control valve along line 7—7 of Fig. 6.

A modified form of the invention, as disclosed in Figs. 6 and 7, provides means for removing oversized particles of agglomerated material that will not pass through the maximum opening of the heretofore described control valves. The structure comprising the storage bin, the air activated gravity conveyors, the bin material discharge openings, and the adjacent unloader are the same as has been set forth above, and therefore the description of these elements will not be repeated. The modification of the invention takes place in the structure of the material control valves, and since all control valves of the modified form are of identical structure, only one will be described in detail.

In the modified form, the control valve is formed by two perforated plates 64 and 65, and a third non-perforated plate 66. The perforated plate 64, having a plurality of openings 67 and a single clean-out port 68 of larger dimensions than the openings 67, is securely attached to the body structure of the unloader 23 by a flange plate 69 held in position by screws 70. The second perforated plate 65, having a plurality of openings 71 and a single clean-out port 72 of larger dimensions than the openings 71, is positioned adjacent the perforated plate 64, and is held in sliding contact therewith by bolts 73 extending through corresponding slots 74 of each perforated plate, and two guide rails 75 and 76 attached to the unloader body structure at each end of the plate 65.

The third non-perforated plate 66 is positioned adjacent the perforated plate 65 and held in sliding contact therewith by guide rails 77 and 78 attached to the underside of the perforated plate 65.

A valve plate adjusting screw 79 extends through the side wall 26 and a threaded boss 80 attached to the side wall. The internal end of the adjusting screw is attached to the perforated plate 65 through a vertical bracket 81 extending downwardly from the plate. The screw 79 may be connected to the bracket 81 in any conventional manner that will permit rotation of the screw, for example, as by washer 82 and cotter pin 83. The external end of the screw 79 has a bolt head 84 for receiving a conventional wrench to provide for the rotation of the screw 79 and the resulting horizontal movement of the perforated plate 65. The horizontal movement of the plate 65 will register its plurality of openings with the plurality of openings 67 of the perforated plate 64 and provide for communication between the hopper bottom receptacle opening and the inlet opening of the unloader, thereby permitting material to flow from the storage bin into the entrainment chamber 24 in a plurality of streams at a controlled rate. The greater the degree of registery between the openings 67 and 71, the greater is the flow of material through the control valve, until the maximum rate of flow is obtained when the two openings 67 and 71 coincide.

A lock nut 85 may be rotated on the screw 79 until it is securely in contact with the outer face of the boss 80 to lock the screw 79, and the plate 65, in any desired position.

A second valve plate adjusting screw 86 extends through the side wall 25 and a threaded boss 87 attached to the side wall. The internal end of the adjusting screw 86 is attached to the non-perforated plate 66 through a vertical bracket 88 extending downwardly from the plate. The screw 86 may be connected to the bracket 88 in any conventional manner that will permit rotation of the screw, for example, as by washer 89 and cotter pin 90. The external end of the screw 86 has a bolt head 91 for receiving a conventional wrench to provide for rotation of the screw 86 and the resulting horizontal movement of the non-perforated plate 66. A lock nut 92 may be rotated on the screw 86 until it is securely in contact with the outer face of the boss 87 to lock the screw 86, and the plate 66, in any desired position.

In the operation of the modified form of the invention the adjusting screw 84 is rotated in the same manner as described for the adjusting screw 57 to regulate the flow of the material through the control valve.

In the event that the material being conveyed tends to agglomerate into oversized particles that will not pass through the openings 67 and 71 of the two perforated plates, the clean-out ports 68 and 72, normally closed by the non-perforated plate 66, are brought into operation to permit removal therethrough of the oversized particles from the upper surface of the valve plate 64.

To remove the oversized particles, the lock nut 92 is loosened to permit rotation of the adjusting screw 86. The rotation of the adjusting screw 86 will impart horizontal movement to the non-perforated plate 66, thereby permitting the material to flow through the clean-out ports 68 and 72. The horizontal movement of the plate 66, and the resulting additional passage for the material through the openings 68 and 72, is only to the degree necessary to permit the oversized material to be removed.

The unloading operator becomes aware of the accumulation of oversized particles on the upper surface of the control valve when the vacuum in the conveying system increases; thereby indicating that the flow of material in the system has decreased or stopped. It may be desirable for the operator to adjust the openings 68 and 72 to permit a small amount of material to flow therethrough during normal unloading if the material has the characteristic of forming into pinnacles over a non-aerated surface. Any pinnacles so formed over the relatively small non-aerated surface of the plate 66 will be swept away by the flow of material through the openings 68 and 72.

Though the apparatus of the present invention has been described in conjunction with vehicles, such as railroad cars, it is obvious that the apparatus is capable of application in any material-storage bin for pulverulent material. Accordingly, the invention is not to be considered restricted to use with vehicles or other mobile bins. Moreover, many other modifications could be made in the apparatus described without departing from the scope of the invention. Consequently, the invention is not to be considered limited to the apparatus specifically shown and described, but rather is limited only by the scope of the appended claims.

I claim:

1. Apparatus for storing and discharging finely divided material comprising a container having at least one discharge opening, means for conveying the material in the container to the discharge opening, said conveying means including means for fluidizing the material being conveyed and delivering it in a fluidized state to the discharge opening, a receptacle positioned beneath the container and having a crosswise and a lengthwise direction, said receptacle having at least one inlet opening and one outlet opening, said receptacle inlet opening communicating with the container discharge opening, means positioned between the container outlet opening and the receptacle inlet opening for controlling both the dispersion and the rate of flow of the material into the receptacle, said control means having a plurality of openings through which the material is adapted to flow in individual streams, and means for the introduction of a stream of gas to be passed lengthwise through said receptacle to entrain the material of the individual streams in the receptacle, the openings in said control means including a plurality of openings having a dimension in a direction crosswise of the receptacle relatively small compared to the crosswise dimension of the receptacle and spaced from one another crosswise of the receptacle, whereby the streams of material flowing from the container into the receptacle are relatively small and are spaced from one another crosswise of the receptacle to more readily facilitate entrainment and removal by the gas passing lengthwise of the receptacle.

2. Apparatus for storing and discharging finely divided material as set forth in claim 1 in which the control means includes at least one perforated plate.

3. Apparatus for storing and discharging finely divided material as set forth in claim 1 in which the control means includes two adjacent plates having a plurality of openings in each plate and at least one of said plates is movable relative to the other plate, whereby the openings in one plate may be brought into and out of registry with the openings in the other plate.

4. Apparatus for storing and discharging finely divided material as set forth in claim 3 in which the receptacle has two side walls and a bottom wall, one of said adjacent plates is held in a non-movable position, and adjusting means extending through one of said side walls of the receptacle with its internal end attached to the movable plate.

5. Apparatus for storing and discharging finely divided material as set forth in claim 3 in which means are provided for removing particles of material of a size too large to pass through said openings in the adjacent plates.

6. Apparatus for storing and discharging finely divided material as set forth in claim 5 in which the means for removing the oversize particles comprises clean-out ports in said plates of a size larger than the openings in said plates and means for bringing said clean-out ports into alignment.

7. Apparatus for storing and discharging finely divided material as set forth in claim 6 which includes valve means mounted for movement into and out of registry with the clean-out ports of said plates when said clean-out ports are at least in partial registry.

8. Apparatus for storing and discharging finely divided material comprising a container having two discharge openings, means for conveying the material in the container and delivering it in a fluidized state to the discharge openings, said means for conveying including a gas permeable member within the container extending from two opposite sides of each discharge opening, a receptacle having two side walls and a bottom wall positioned beneath the container and having a crosswise direction and a lengthwise direction, said receptacle having two inlet openings and two outlet openings, said receptacle inlet openings communicating with the container discharge openings, means positioned between each of the container outlet openings and the corresponding receptacle inlet openings for controlling both the dispersion and the rate of flow of the material into the receptacle, said control means including two adjacent plates having a plurality of openings in each plate through which the material is adapted to flow in individual streams, one of said plates being held in a non-movable position and the other of the said plates being movable with respect to the non-movable plate, an adjusting means for each movable plate extending through a wall of the receptacle, the internal end of said adjusting means being attached to the movable plate, whereby movement of the external end of the adjusting means will register the plurality openings of one plate with the plurality of openings of the other plate, and means for the introduction of a stream of gas to be passed lengthwise through said receptacle to entrain the material of the individual streams in the openings in said plates including a plurality of openings having a dimension in a direction crosswise of the receptacle relatively small compared to the crosswise dimension of the receptacle and spaced from one another crosswise of the receptacle, whereby the streams of material flowing from the container into the receptacle are relatively small and are spaced from one another crosswise of the receptacle to more readily facilitate entrainment and removal by the gas passing lengthwise of the receptacle.

9. Apparatus for storing and discharging finely divided material as set forth in claim 8 in which the receptacle forms an air-material entrainment chamber, and a transition section is attached to each of the entrainment chamber outlet openings and the other ends of the transition sections having a cross-sectional shape different from the cross-sectional shape of the inner ends for connection to conduits of corresponding cross-sectional shape.

10. A control valve comprising two adjacent plates having a plurality of openings in each plate, said plurality of openings in one plate normally being out of registry with the plurality of openings in the other plate, one of said plates being held in a non-movable position and the other of said plates being movable with relation to the non-movable plate, an adjusting means, said adjusting means being attached to the movable plate, whereby movement of the adjusting means will register the plurality of openings of one plate with the plurality of openings of the other plate, a clean-out port in each of said two adjacent plates, said clean-out ports normally being in registry, a third plate, said third plate being positioned adjacent the clean-out port of one of said plates and normally closing the port thereof, and a second adjusting means, said second adjusting means being attached to said third plate, whereby movement of the second adjusting means will move said third plate to permit discharge of material through said clean-out ports.

11. Apparatus for storing and discharging finely divided material comprising a container having at least one discharge opening, means for conveying the material in the container to the discharge opening, a receptacle positioned beneath the container and having a crosswise and a lengthwise direction, said receptacle having at least one inlet opening and one outlet opening, said receptacle inlet opening communicating with the container discharge opening, means positioned beneath the container outlet opening and the receptacle inlet opening for controlling both the dispersion and the rate of flow of the material into the receptacle, said control means including two adjacent plates having a plurality of openings in each plate, one of said plates being held in a non-movable position and the other of said plates being movable with respect to the non-movable plate, an adjusting means for the movable plate extending through a wall of the receptacle, the internal end of said adjusting means being attached to the movable plate, whereby movement of the external end of the adjusting means will register the plurality of openings of one plate with the plurality of openings of the other plate, and means for the introduction of a stream of gas to be passed lengthwise through said receptacle to entrain the material of the individual streams in the receptacle, the openings in said control means including a plurality of openings having a dimension in a direction crosswise of the receptacle relatively small compared to the crosswise dimension of the receptacle and spaced from one another crosswise of the receptacle, whereby the streams of material flowing from the container into the receptacle are relatively small and are spaced from one another crosswise of the receptacle to more readily facilitate entrainment and removal by the gas passing lengthwise of the receptacle.

References Cited in the file of this patent
UNITED STATES PATENTS

| | | |
|---|---|---|
| 511,781 | Leggett | Jan. 2, 1894 |
| 2,129,252 | Whiteside | Sept. 6, 1938 |
| 2,657,100 | Weller | Oct. 27, 1953 |
| 2,681,748 | Weller | June 22, 1954 |
| 2,694,496 | Atkinson | Nov. 16, 1954 |